(12) United States Patent
Dengel et al.

(10) Patent No.: US 7,737,578 B2
(45) Date of Patent: Jun. 15, 2010

(54) METHOD AND DEVICE FOR SUPPORTING THE ALTERNATING CURRENT FREQUENCY IN AN ELECTRICITY NETWORK

(75) Inventors: Andreas Dengel, Neunkirchen (DE); Heinz-Kurt Dörr, St. Ingbert-Hassel (DE)

(73) Assignee: Evonik Power Saar GmbH, Marl (DE)

( * ) Notice: Subject to any disclaimer, the term of this patent is extended or adjusted under 35 U.S.C. 154(b) by 393 days.

(21) Appl. No.: 11/794,836

(22) PCT Filed: Jan. 5, 2006

(86) PCT No.: PCT/EP2006/000048
§ 371 (c)(1),
(2), (4) Date: Jul. 6, 2007

(87) PCT Pub. No.: WO2006/072576
PCT Pub. Date: Jul. 13, 2006

(65) Prior Publication Data
US 2008/0001479 A1 Jan. 3, 2008

(30) Foreign Application Priority Data
Jan. 7, 2005 (DE) .................. 10 2005 001 009

(51) Int. Cl.
*H02J 3/14* (2006.01)
(52) U.S. Cl. ....................................... 307/34
(58) Field of Classification Search ............ 307/29, 307/34
See application file for complete search history.

(56) References Cited

U.S. PATENT DOCUMENTS

| | | | | |
|---|---|---|---|---|
| 4,253,308 | A | * 3/1981 | Eggenberger et al. | ......... 60/664 |
| 6,338,009 | B1 | * 1/2002 | Sato et al. | ................... 700/286 |
| 2005/0165511 | A1 | * 7/2005 | Fairlie | ........................ 700/286 |
| 2006/0208571 | A1 | * 9/2006 | Fairlie | ........................ 307/11 |

FOREIGN PATENT DOCUMENTS

| | | |
|---|---|---|
| DE | 4436904 | 4/1996 |
| DE | 10207791 | 9/2003 |
| EP | 0084815 | 1/1983 |
| JP | 60/223905 | 11/1985 |
| JP | 11/072028 | 3/1999 |

* cited by examiner

*Primary Examiner*—Robert L. Deberadinis
(74) *Attorney, Agent, or Firm*—James Creighton Wray; Meera P. Narasimhan

(57) ABSTRACT

The invention relates to a method and a device for supporting the frequency in an electricity network (5) during a sudden modification of the network load and/or generating power. According to the invention, modifications of the network load and/or generating power, which cause the network frequency to deviate from a predefined value, are compensated by a modification of an additional load (6). Said additional load (6) is preferably configured by a large number of hydrogen-producing electrolysis units (7), which can be activated or deactivated for the successive modification of the additional load.

11 Claims, 1 Drawing Sheet

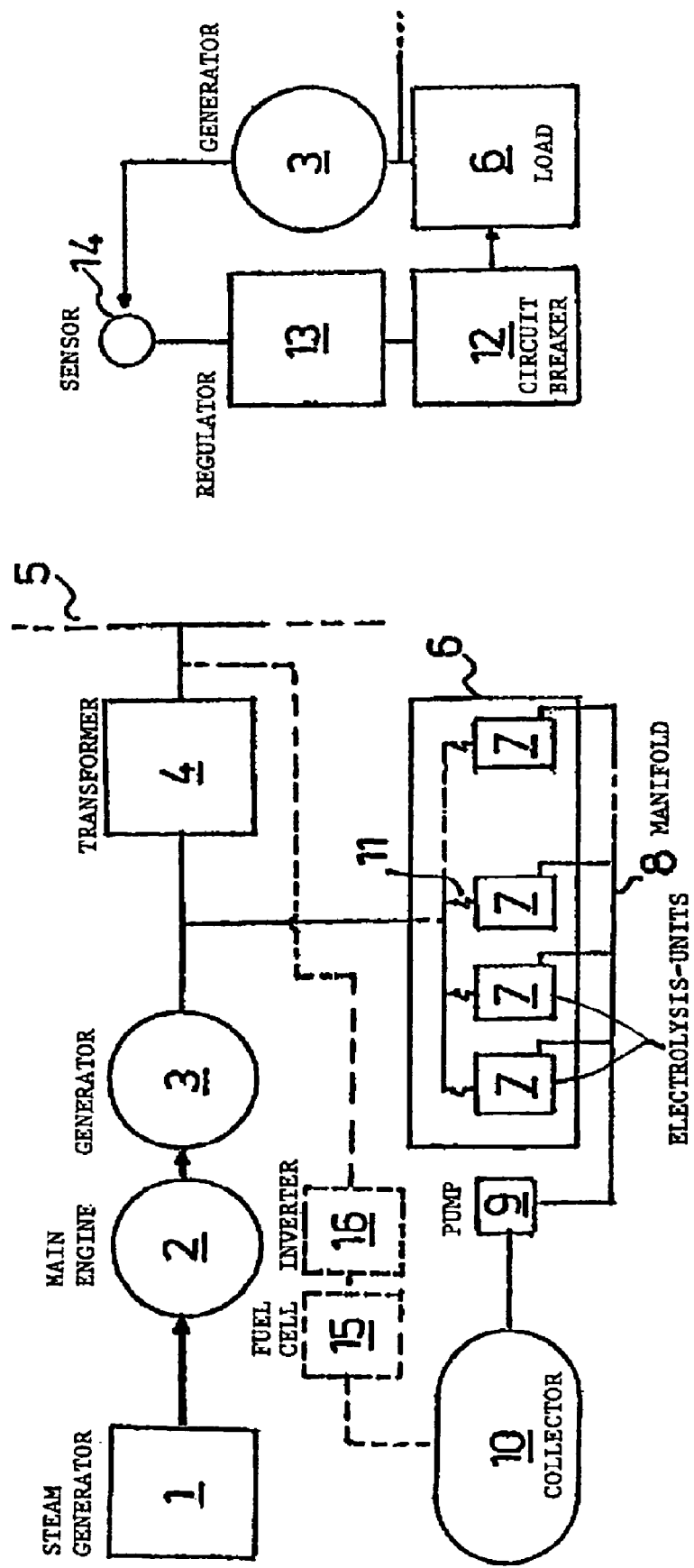

METHOD AND DEVICE FOR SUPPORTING THE ALTERNATING CURRENT FREQUENCY IN AN ELECTRICITY NETWORK

This application claims the benefit of German Application No. 10 2005 001 009.1 filed Jan. 7, 2005 and PCT/EP2006/000048 filed Jan. 5, 2006, which are hereby incorporated by reference in their entirety.

The invention relates to a method and a device for supporting the alternating current frequency in an electricity network.

Maintaining a constant alternating current frequency in electricity networks is an important function. Deviations from a predefined value can cause a malfunction in connected networks and consequential damages as a result thereof.

Deviations from a predefined network frequency value occur especially when the demands on the power plants that are connected to the electricity network experience a sudden modification, because, for example, a power plant is separated from the network due to a collision, or a major consumer is added. In order to maintain the predetermined value at a constant rate or within a certain tolerance range, care must be taken within the framework of the so-called primary control that the generating power and the network load remain balanced and always generate as much electrical power as is consumed by the network load during its operation with the predetermined network frequency.

In order to quickly counteract modifications of the network frequency caused by short-term modifications to loads, the steam-turbine main engines of the power plant generators are commonly operated in sliding pressure mode with throttled adjustment valves. By opening or further closing the adjustment valves, the mechanical generating power can, in the event of a modification of the network frequency, be quickly modified in order to support the network frequency. In power plants that are involved in the frequency support, the modification of the generating power takes place within the scope of primary control in relation to the network frequency according to the so-called proportionate level.

The throttling adversely reduces the level of effectiveness of the main engine. The specific fuel consumption is accordingly high in relation to the respective mechanical generating power.

In the condensate-stop mode, which is commonly also used for short-term modification of the generating power by the main engine, such losses, which are caused due to an impaired level of efficiency by the main engine, are smaller, however larger volumes must be made available in the steam-condensate cycle. Older power plants cannot be retrofitted.

The invention at hand is based on the object of decreasing the energy- or construction expenditures commonly related to the support of the network frequency.

This object is attained by the characteristics of the method according to claim 1 as well as the device according to claim 7.

According to the invention, short-term modifications of the power demands for the support of the network frequency are not, as according to the prior art, compensated by the electricity network by means of respective modifications to the mechanical load of the main engines, but by modifications of an additional load.

The volume of said additional load is preferably configured faster than the machine generating load. Deviations from the predetermined network frequency value may subsequently be controlled faster. Since, according to the invention, the load of the main engine in the frequency support procedure can remain constant, throttling is no longer necessary and the main engine may be operated at the highest degree of efficiency for the individual mechanical power output. The additional effort in drive energy, which is necessary for the additional load, for the generators involved in the frequency support is counteracted by the savings achieved by the operation of the drive machines at optimum efficiency levels.

In an especially preferable embodiment of the invention, the electrical power of the generator, which applies to the additional load, is used for the generation of a usable by-product.

This can especially be a product that is producible by electrolysis, for instance a metal or a hydrogen gas.

Electrolysis units can preferably be activated or deactivated as an additional load, wherein the functionality and lifespan of such units are effected very little even by frequent activation or deactivation cycles.

The additional load can be established by means of a parallel connection of a multitude of load units, especially electrolysis units, which can be successively activated or deactivated. Within the course of the frequency support, units are activated or deactivated in the power plants, which are involved in the primary control, in such numbers that the network frequency remains within the predetermined tolerance range.

If necessary, the drive power of the generators is modified following an activation or deactivation of units in such a manner that the number of load units that are to be activated or deactivated for the frequency support can again be selected according to the previous condition.

Any gained hydrogen can be applied for the reclamation of electrical energy, wherein the application of fuel cells appears to be preferable. Gained electrical energy can thus be fed into the network through downstream inverters.

The invention is further described in the following by means of an exemplary embodiment as well as the included illustrations, which are directly related to this embodiment. The following shows in:

BRIEF DESCRIPTION OF THE DRAWINGS

FIG. 1 a schematic representation of a power plant with a device for supporting the network frequency according to the invention.

FIG. 2 a schematic representation of a controlling circuit as utilized in the device of FIG. 1.

DETAILED DESCRIPTION OF THE PREFERRED EMBODIMENTS

A steam generator 1 of a power plant supplies the steam for a steam-turbine main engine 2, which drives a generator 3.

The generator 3 generates electrical energy, which is supplied through a network transformer 4 to an electrical network 5.

Parallel to the electrical network 5 an additional load 6, which in the specific exemplary embodiment includes a parallel connection of a number of electrolysis units 7, is connected to the generator 3. The electrolysis units 7, each of which has one transformer and one inverter, are generating hydrogen gas. The hydrogen gas, which is generated under pressure, reaches a collector 10 through a manifold 8 and a pump 9. The electrolysis units 7 of the additional load 6 can be individually engaged to and/or disengaged from the generator 3 by a switch 11.

The switches 11 are components of a circuit breaker 12, which is illustrated in FIG. 2, and which is controlled by a regulator 13. Regulator 13 is connected to a sensor 14 for capturing the rotational frequency of the turbine of the main engine 2.

During normal operation of the power plant, the generator 3 is driven by the main engine 2, with relatively short-term constant mechanical power, which is relative to the individual network demand. Main engine 2 and steam generator 1 are adjusted in such a manner that the generation of drive power takes place at the highest level of efficiency, i.e. the least possible use of fuel. According to the mechanical drive power of the main engine 2, the generator 3 generates electric power, which is distributed to the electrical network 5 and the additional load 6. The rotational frequency of the generator is equal to the network frequency, and is therefore normally 50 Hz. One half of the electrolysis units 7 generates an additional load 6.

When, for instance, a power plant is separated from the network or a large consumer is added, the load increases for all power plants connected to the electrical network 5. Due to this additional load the rotational frequency of all power plant generators, and therefore the network frequency, decreases evenly.

An automatic regulator, illustrated in FIG. 2, helps to again raise the network frequency to its predetermined value and/or keep it at a predetermined tolerance value.

A sensor 14 measures the rotational frequency of the generator 3, and a regulator 13 constantly compares the measured rotational frequency with the predetermined value of the network frequency of 50 Hz. Depending on the determined deviation, the regulator 13 generates control signals to deactivate the electrolysis units 7. The power of the power plant available for the network 5 is thus increased.

Because all power plants that are involved in the frequency support increase their power in such a manner that a power sector that is suddenly lost or a sudden demand for additional power is thereby offset, the network frequency can again ascend to the predetermined value.

If, in turn, the load that is generated by the network 5 decreases in the short-term, e.g. by separating a large consumer from the network, then a respective balance can be established by activating the electrolysis units 7.

The electrolysis units permit a short-term activation or deactivation of loads within a matter of seconds. Deviations in the network frequency from the predetermined value can be controlled relatively fast.

The function and lifespan of electrolysis units 7 are affected very little by frequent activation or deactivation cycles.

The generated hydrogen gas is further compressed via a pump 9, and is then pumped into a storage unit 10. The hydrogen could also be used to drive motor vehicles, for example. Power plants could gain importance as suppliers of fuel within the structure of a hydrogen-based economy.

Another possible use is marked by a broken line. The hydrogen could be used in a fuel cell 15 to generate electrical energy, which is fed into the electrical network 5 through an inverter 16.

The invention claimed is:

1. Method for supporting the frequency in an alternating current frequency network (5) including a number of power plants, wherein deviations from a predefined value of the network frequency that occur due to sudden modifications of the network load and/or generating power are compensated by a decrease or increase of an additional load (6), wherein the additional load (6) is installed in a power plant, which is involved in frequency support, wherein the additional load incorporates several load units (7), which can be activated and/or deactivated for the successive modification of the additional load (6), and wherein the power plant is operated in a sliding pressure mode with non-throttled turbine adjustment valves so that the power plant in each case is operated at maximum efficiency.

2. Method according to claim 1, wherein the electrical performance of the generator (3), which applies to the additional load (6), serves to generate a by-product.

3. Method according to claim 2, wherein the by-product is generated by electrolysis.

4. Method according to claim 3, wherein the generated by-product is hydrogen.

5. Method for supporting the frequency in an alternating current frequency network (5) including a plurality of power plants, wherein deviations from a predefined value of the network frequency that occur due to sudden modifications of the network load and/or generating power are compensated by a decrease or increase of an additional load (6), and wherein the additional load can be adjusted for supporting the network frequency in the event of a short-term modification of the network load and/or generating power while balancing the modification to support the network frequency, wherein the additional load is installed in a power plant as part of the power plant's dead load.

6. Method according to claim 5, wherein an electrolysis unit 7 is provided for establishing the additional load (6).

7. Method according to claim 6, wherein the electrolysis unit (7) is provided for the generation of hydrogen.

8. Method according to claim 7, wherein the installations (15, 16) are provided for the hydrogen-generated electrical energy, which is fed into the electricity network (5).

9. Method according to claim 8, wherein the installations (15, 16) incorporate a fuel cell (15).

10. Method according to claim 5, wherein the additional load incorporates several load units (7), which can be activated and/or deactivated for the successive modification of the additional load (6).

11. Method according to claim 10, wherein the load units are electrolysis units (7).

\* \* \* \* \*